United States Patent
Koskela

(10) Patent No.: US 12,251,670 B2
(45) Date of Patent: Mar. 18, 2025

(54) PRODUCTION OF NANOSCALE EMULSION

(71) Applicant: BDC—Technology Oy, Siilinjärvi (FI)

(72) Inventor: Juha Koskela, Siilinjärvi (FI)

(73) Assignee: BDC—TECHNOLOGY OY, Siilinjärvi (FI)

( * ) Notice: Subject to any disclaimer, the term of this patent is extended or adjusted under 35 U.S.C. 154(b) by 1001 days.

(21) Appl. No.: 17/050,044

(22) PCT Filed: Apr. 25, 2019

(86) PCT No.: PCT/FI2019/050332
§ 371 (c)(1),
(2) Date: Oct. 23, 2020

(87) PCT Pub. No.: WO2019/207206
PCT Pub. Date: Oct. 31, 2019

(65) Prior Publication Data
US 2021/0106956 A1    Apr. 15, 2021

(30) Foreign Application Priority Data
Apr. 26, 2018   (FI) ...................................... 20185392

(51) Int. Cl.
*B27K 3/08* (2006.01)
*B01F 23/411* (2022.01)
*B27K 3/12* (2006.01)
*B27K 3/50* (2006.01)
*C08L 93/04* (2006.01)
(Continued)

(52) U.S. Cl.
CPC ............ *B01F 23/4111* (2022.01); *B27K 3/08* (2013.01); *B27K 3/12* (2013.01); *B27K 3/50* (2013.01); *C08L 93/04* (2013.01); *C09D 5/022* (2013.01); *C09D 5/027* (2013.01); *D06M 15/17* (2013.01); *B01F 23/4145* (2022.01);
(Continued)

(58) Field of Classification Search
CPC .... B01F 23/4111; B01F 23/4145; B27K 3/08; B27K 3/12; B27K 3/50; B27K 2240/00; C08L 93/04; C09D 5/022; C09D 5/027; D06M 15/17; D06M 2200/12; B82Y 40/00
USPC ......................................................... 106/238
See application file for complete search history.

(56) References Cited

U.S. PATENT DOCUMENTS 2,530,810 A   11/1950  Christenson et al.
3,719,606 A   3/1973   Froning et al.
(Continued)

FOREIGN PATENT DOCUMENTS

AU     62007/65       2/1967
CN     104875254 A    9/2015
(Continued)

OTHER PUBLICATIONS

CN101405340, published 2009, Heiskanen—machine translation.*
(Continued)

*Primary Examiner* — Smita S Patel
(74) *Attorney, Agent, or Firm* — Birch, Stewart, Kolasch & Birch, LLP

(57) ABSTRACT

The present invention relates to a method of producing a wood and textile fibre protection composition from tall oil pitch. The present invention also relates to a wood and textile fibre protection composition comprising tall oil pitch and use of the composition as a wood and textile fibre protection agent.

8 Claims, 3 Drawing Sheets

(51) Int. Cl.
  *C09D 5/02*   (2006.01)
  *D06M 15/17*  (2006.01)
  *B01F 23/41*  (2022.01)
  *B82Y 40/00*  (2011.01)

(52) U.S. Cl.
  CPC ........... *B27K 2240/70* (2013.01); *B82Y 40/00* (2013.01); *D06M 2200/12* (2013.01)

(56) References Cited

U.S. PATENT DOCUMENTS

| | | | |
|---|---|---|---|
| 3,817,768 A | 6/1974 | Aldrich | |
| 4,917,930 A * | 4/1990 | McCormick | A61K 9/0026 514/832 |
| 2011/0049417 A1 | 3/2011 | Swift et al. | |
| 2011/0054098 A1 | 3/2011 | Tutin et al. | |

FOREIGN PATENT DOCUMENTS

| | | |
|---|---|---|
| WO | WO 87/06177 A1 | 10/1987 |
| WO | WO 2011/080399 A1 | 7/2011 |
| WO | WO 2011/144729 A2 | 11/2011 |
| WO | WO 2013/060943 A1 | 5/2013 |

OTHER PUBLICATIONS

WO2016189200 published 2016 by Orte (Year: 2016)—machine translation.*
Bassyouni et al., "Synthesis and characterization of polyurethane—Treated waste milled light bulbs composites", Composites: Part B, 2012, vol. 43, pp. 1439-1444.
Finnish Search Report, issued in Priority U.S. Appl. No. 20/185,392, dated Nov. 20, 2018.
International Search Report, issued in PCT/FI2019/050332, dated Jul. 24, 2019.
Written Opinion of the International Searching Authority, issued in PCT/FI2019/050332, dated Jul. 24, 2019.

* cited by examiner

PRODUCTION OF NANOSCALE EMULSION

FIELD OF THE INVENTION

The present invention relates to a method of producing a nanoscale tall oil pitch emulsion. The present invention also relates to a nanoscale tall oil pitch emulsion and use of the emulsion as a wood and textile fibre preservative.

BACKGROUND OF THE INVENTION

Raw wood materials are costly and raising the degree of processing is widely seen as a way to secure the growth of the wood processing industry or maintaining productivity at the present level. Inhibition of biological degradation of to wood and improvement of fire and water resistance of wood are areas in which the degree of wood processing should particularly be increased. Preventing changes in colour (UV stability), dimensions or cracking, increasing the strength of wood, engineering wood structures and preventing microbial damage from e.g. blue stain or mould are significant aspects of these development goals.

Earliest wood preservation methods include carbonization treatment and soaking in wood tar. In addition to these, industrial development has brought along other preservative materials such as oils, glues, resins, rubbers and salts. Oil borne preservatives are based on oils, coal and materials derived from coal and petroleum products. These include e.g. creosote, carbolineum, coal tar, brown coal tar and wood-tar. In addition, creosotes can be supplemented with toxic substances such as PCP (pentachlorophenol), copper, arsenic or zinc. One of the problems associated with the currently available preservatives is that their degree of toxicity renders them unsafe for humans as well as environmentally hazardous, and thus limits their production and utilization.

Crude tall oil (CTO) is a major resinous by-product from the manufacture of chemical wood pulp. CTO is used in the manufacture of products such as soaps, coatings and oils. Tall oil is known to inhibit growth of rot fungi in culture media and on wood. One of the disadvantages of crude tall oil is its tendency to exude from wood. The tendency arises from high amounts of crude tall oil used and a lack of oxygen inside the wood, which prevents polymerization and oxidation of the oil and causes the oil to exude with time to form a pitch-like surface. This restricts the applicability of wood products treated with crude tall oil.

Tall oil distillation removes low viscosity tall oil and resin acids fractions from crude tall oil, leaving a high viscosity distillation residue called tall oil pitch (TOP). A typical tall oil pitch material may include 12-30% rosin acids and esters, 35-50% fatty acids and 20-35% neutral materials. Tall oil pitch is readily soluble in aliphatic and aromatic hydrocarbons such as long chain alcohols which are compatible with a variety of oils, asphalts and rosins. In Finland, crude tall oil is distilled in two distillation plants, Arizona Chemical Oy and Forchem Oy. The total annual tall oil distillation capacity in Finland is about 300 000 tons, giving approximately 100 000 tons of tall oil pitch per year. One of the problems associated with TOP is its underutilized potential and lack of applications for use. TOP is currently used mainly for fuel or in asphalt production.

BRIEF DESCRIPTION OF THE INVENTION

An object of the present invention is thus to provide a nanoscale emulsion, a method for producing a nanoscale tall oil pitch emulsion, and use of a nanoscale emulsion so as to overcome the above problems.

The objects of the invention are achieved by a nanoscale emulsion and a method for producing a nanoscale emulsion, which are characterized by what is stated in the independent claims. Preferred embodiments of the invention are disclosed in the dependent claims.

In an embodiment, the method for producing a nanoscale tall oil pitch emulsion comprises the following steps:
a) providing an aqueous solution of an alkaline agent, the solution having a pH in the range of 8 to 13,
b) providing tall oil rosin,
c) mixing the tall oil rosin with the aqueous solution of the alkaline agent to produce a tall oil rosin solution,
d) providing a co-surfactant,
e) mixing the co-surfactant with the tall oil rosin solution to produce a co-surfactant-tall oil rosin solution,
f) providing tall oil pitch,
g) adding the tall oil pitch gradually to the co-surfactant-tall oil rosin solution while continuously homogenizing in a homogenizer to produce a nanoscale tall oil pitch emulsion,
wherein the co-surfactant is an organic solvent having a hydrocarbon chain of 1 to 6 carbons, and
wherein the homogenizer is a high pressure valve homogenizer, microfluidizer, or a sonicator, preferably an ultrasonicator.

In another embodiment of the present invention, the nanoscale emulsion comprises tall oil pitch, tall oil rosin and isopropanol, wherein the nanoscale emulsion is produced in a homogenizer, wherein the homogenizer is a high pressure valve homogenizer, microfluidizer, or a sonicator, preferably an ultrasonicator.

In yet another embodiment of the present invention, the nanoscale tall oil pitch emulsion is used as a wood or textile fibre preservative.

In yet another embodiment of the present invention, the nanoscale tall oil pitch emulsion is used as a preservative for tight grained wood.

An advantage of the invention is that using a tall oil pitch nanoemulsion may improve the penetration depth of tall oil pitch based products and primarily the nanoscale TOP emulsion into wood of textile fibres. The nanoscale TOP emulsion penetrates easily into the wood fibre structure to form stable and non-tacky layers within the wood or on the surface of the wood. This, in turn, may improve UV resistance and colour stability of the treated wood. Furthermore, penetration into wood may increase hydrophobicity of the treated wood, water resistance and mould and blue stain resistance properties of the wood fibre as well as strength of fibre products.

A further advantage of the invention is that workability of the nanoscale TOP emulsion is good. Furthermore, stability of the nanoscale TOP emulsion may improve use of the nanoscale TOP emulsion of the present invention. Also, using the nanoscale TOP pitch emulsion facilitates treatment of wood under winter conditions where processing of frozen wood (for example thawing, impregnation, planning, painting etc.) is problematic and constitutes extra costs. Nanoscale TOP emulsion compositions may improve the anti-freeze properties of the treated wood materials.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
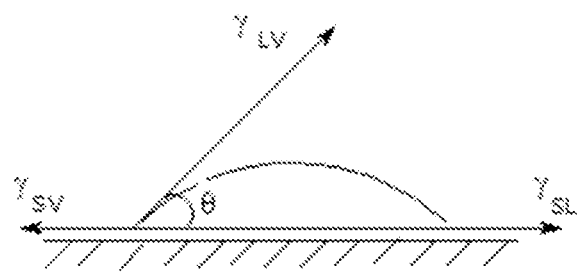
FIG. 1 shows surface tension forces for an idealised liquid drop on a plane solid surface. θ is the contact angle with the solid surface, γSL is the tension at the solid-liquid interface, γSV is the tension at the solid-vapour interface and γLV is the tension at the liquid-vapour interface.

The invention is based on a method for producing a nanoscale TOP emulsion comprising tall oil rosin, tall oil pitch and optionally isopropanol. It has surprisingly been discovered that the nanoscale TOP emulsion is suitable for use as a wood protection agent as it provides improved penetration depth into the wood fibre structure. In this context, the terms nanoscale emulsion, nanoemulsion, nanoscale tall oil pitch emulsion, nanoscale TOP emulsion, tall oil pitch nanoemulsion or TOP nanoemulsion may be used interchangeably.

In an embodiment the method for producing nanoscale tall oil pitch emulsion comprises the following steps:
 a) providing an aqueous solution of an alkaline agent, wherein the aqueous solution has a pH in the range of 8 to 13,
 b) providing tall oil rosin,
 c) mixing the tall oil rosin with the aqueous solution of the alkaline agent to produce a tall oil rosin solution,
 d) providing a co-surfactant,
 e) mixing the co-surfactant with the tall oil rosin solution to produce a co-surfactant-tall oil rosin solution,
 f) providing tall oil pitch,
 g) adding the tall oil pitch gradually to the co-surfactant-tall oil rosin solution under continuous homogenization in a homogenizer to produce the nanoscale tall oil pitch emulsion,
 wherein the co-surfactant is an organic solvent having a hydrocarbon chain of 1 to 6 carbons, and
 wherein the homogenizer is a high pressure valve homogenizer, microfluidizer, or a sonicator, preferably an ultrasonicator.

A nanoemulsion (or a nanoscale emulsion) is typically defined as a colloidal dispersion consisting of two immiscible liquids, with one of the liquids being dispersed as small spherical droplets (radius <100 nm) in the other liquid. As opposed to nanoemulsions, microemulsions can be formed spontaneously by bringing oil, water and surfactant together at a particular temperature without supplying any external energy. In practice, it is often necessary to apply some external energy in the form of stirring or heating to form a microemulsion. In contrast, nanoemulsions require the input of intense external energy to convert the separate components into a colloidal dispersion. Approaches for external energy input may utilize mechanical devices (which may also be referred to as homogenizers or homogenizing devices) capable of generating intense disruptive forces that disrupt and intermingle the oil and water phases so that tiny droplets are formed. Examples of homogenizers include high pressure valve homogenizers, microfluidizers, and sonicators such as ultrasonicators.

The method for producing nanoscale tall oil pitch emulsion comprises homogenization in a homogenizer that is a high pressure valve homogenizer, microfluidizer, or a sonicator, preferably an ultrasonicator.

Wood is a porous and fibrous structural tissue found in the stems and roots of woody plants. The high strength of cellulosic wood fibres has led to the use of wood as construction material, often exposing the wood fibre material to weathering. Thus, wood typically requires treatment with wood protection agents (also known as preservatives or preservative materials) to protect the wood from elements such as rain, snow, micro-organisms or UV-irradiation.

The composition of the present invention is a nanoscale emulsion which may be used for the treatment of both processed timber and raw timber. The treatment may be given either at wood storage sites or in a separate processing mill for timber, where the composition and the wood may be brought into contact in a variety of ways. Similarly, the composition of the present invention may be used for the preservation of stationary structures already erected, particularly outdoors, where primarily spraying and brushing of the surfaces may be used. Because of non-toxicity of the composition according to the invention, nanoscale TOP emulsion may be used for treatment of wood fibre materials in their locations of use even without safety equipment.

The composition of the present invention is suited for treatment processes requiring good penetrability into wood fibres and also other fibres such as textile fibres. In this context, the fibre for which the composition is intended, refers to all materials and products that contain wood and textile materials including raw timber, sawn timber, wooden building materials and elements and various finished fibre products including round logs, sawn timber such as boards, planks and laths, elements with a large surface area such as plates, panels, blocks, wall elements, furniture and other wooden products. The wood to be treated may also be present in fixed structures, particularly outdoor structures such as wooden buildings, fences, racks, poles, bridges and piers. Wood and textile also refers to converted wood products containing the original structure of wood such as wood material that has been ground or chipped and reworked such as chip board, glulam, oriented strand board (OSB), cross laminated timber (CLT) and laminated veneer lumber (LVL).

In an embodiment, the nanoscale emulsion is used as a wood or textile fibre preservative.

The composition of the invention may be used for protecting objects not completely made of wood but, for example, a combination of wood and another material, even construction materials such as concrete, stone and plastic. The composition of the invention may be used for protecting houses, warehouses and living areas against insects, termites, mould, blue stain, UV and moisture by simply spraying or brushing on the protected surfaces.

The composition of the present invention is usable for different tree species or tree qualities, for example pine, which is conventionally treated with chromated copper arsenate (CCA), usually by pressure impregnation. The composition of the present invention may be used as a preservative for protecting tight grained wood material such as spruce which is difficult to impregnate with CCA. The composition of the present invention is environmentally more recommendable than CCA and may be used to improve the preservation of types of wood which have previously been difficult to treat.

In an embodiment, the nanoscale emulsion is used as a preservative for tight grained wood.

The composition of the present invention makes it possible to treat wood materials in a simple and cost-efficient way, and the treatment may be easily included in other conventional steps of wood treatment. The process may be one step in a processing line of timber or wooden materials comprising successive steps. The composition according to the present invention is also pleasant to handle because it does not emit strongly irritating odours.

Using nanoscale TOP emulsion for treating wood according to the invention comprises bringing the wood fibre in contact with the nanoscale TOP emulsion, the result being impregnation of the wood to a certain depth by immersion impregnation, pressure impregnation or surface treatment or a combination of these.

Immersion impregnation is a simple method for treating wood fibre material that involves immersing the material to be treated in an impregnation solution. Immersion impregnation is typically carried out in batch processes and requires separate immersion basins. As penetrability of nanoscale TOP emulsion is good, immersion impregnation is a highly practical way for wood material treatment by nanoscale TOP emulsion. An increased temperature accelerates the penetration of nanoscale TOP emulsion into the wood. At room temperature the penetration depth is typically a few millimetres but may be improved at elevated temperatures.

Pressure impregnation is a method for enhanced penetration of preservative substance into wood, thereby providing a highly effective treatment. Pressure impregnation process involves keeping the wood material under negative pressure to remove water from the wood fibres, after which the impregnation composition is brought in contact with the wood and its penetration enhanced through overpressure. Pressure impregnation is typically performed at an elevated temperature through a series of negative pressure and overpressure steps. By this method wood may normally be impregnated to the core. Pressure impregnation is suitable for nanoscale TOP emulsion which is able to penetrate the wood to the core. Normal pressure impregnation parameters, a maximum pressure of ca. 10 bars at room temperature, may be used for the treatment. As nanoscale TOP emulsion has a very good penetrability, it is possible to reduce the negative pressures/overpressures used in conventional pressure impregnation and thereby improve cost-effectiveness of the process.

Nanoscale TOP emulsion may also be sprayed onto the surface of the wood fibre material. A 20% nanoscale TOP emulsion requires few minutes to dry completely. Higher concentrations of tall oil in the nanoscale TOP emulsion may require ca. 1-2 hours to dry at room temperature. At elevated temperatures, the drying time may be shortened.

Nanoscale TOP emulsion may also be applied onto the wood material by painting or other surface treatment procedure involving spreading of the treatment solution onto the surface. By using a paint dosing system a wood material may be impregnated with the solution under overpressure or under pressure methods. Depending on the pressure and the speed of the painting or other treatment, relatively good penetrability and thereby a reasonable resistance to weather, blue stain, mould and fire may be achieved by this procedure.

In an embodiment, the nanoscale emulsion is used as a preservative by treating the wood or textile fibre with the nanoscale emulsion by immersion impregnation, pressure impregnation, spraying or surface treatment or a combination thereof.

The composition of the present invention, the nanoscale TOP emulsion is a nanoemulsion of tall oil pitch. The nanoscale TOP emulsion further comprises tall oil rosin as an emulsifier.

The nanoscale TOP emulsion further comprises a substance acting as a co-surfactant to lower the surface tension between the nanoscale emulsion liquid and the solid surface of the wood and/or textile fibres. The co-surfactant substance is an organic solvent that has a hydrocarbon chain of 1-6 carbons. The hydrocarbon chain may be aromatic or aliphatic, branched, straight or cyclic. The co-surfactant may be an alcohol. The co-surfactant may be isopropanol.

In the method for producing nanoscale tall oil pitch emulsion, the co-surfactant is an organic solvent that has a hydrocarbon chain of 1 to 6 carbons. In an embodiment, in the method for producing nanoscale tall oil pitch emulsion, the co-surfactant is an alcohol, preferably isopropanol.

The nanoscale TOP emulsion is prepared in an alkaline aqueous solution. The alkaline aqueous solution preferably has a pH in the range of 8 to 13. The alkaline or basic agent in the aqueous solution is typically a hydroxide of an alkali metal or alkaline earth metal, an oxide, a carbonate, ammonia or ammonium hydroxide. Preferably, the alkaline agent is NaOH.

In another embodiment, in the method for producing nanoscale tall oil pitch emulsion, the alkaline agent is a hydroxide of an alkali metal or alkaline earth metal, preferably sodium hydroxide.

Nanoscale TOP emulsion is typically prepared as a 20% solution where components of the emulsion composition excluding water together make up approximately 20% of the mass of water. Typically, 20% nanoscale TOP emulsion comprises 12.27 kg of tall oil pitch, 74.1 kg of water, 0.10 kg of NaOH, 0.59 kg of tall oil rosin and 1.85 kg of isopropanol (Table 1). The components excluding water weigh in total 14.81 kg which is approximately 20% of the mass of water. The amounts of components may be scaled up or down while maintaining the same weight percentages of the components in order to prepare a smaller or a larger batch of 20% nanoscale TOP emulsion.

In another embodiment, nanoscale TOP emulsion is prepared as a 35% solution wherein components of the emulsion composition excluding water together make up approximately 35% of the mass of water. Typically, 35% nanoscale TOP emulsion comprises 21.48 kg of tall oil pitch, 74.1 kg of water, 0.17 kg of NaOH, 1.03 kg of tall oil rosin and 3.24 kg of isopropanol (Table 1). The components excluding water weigh in total 25.92 kg which is approximately 35% of the mass of water. The amounts of components may be scaled up or down while maintaining the same weight percentages of the components in order to prepare a smaller or a larger batch of 35% nanoscale TOP emulsion.

In yet another embodiment, nanoscale TOP emulsion is prepared as a 40% solution wherein components of the emulsion composition excluding water together make up approximately 40% of the mass of water. Typically, 40% nanoscale TOP emulsion comprises 24.54 kg of tall oil pitch, 74.1 kg of water, 0.19 kg of NaOH, 1.18 kg of tall oil rosin and 3.70 kg of isopropanol (Table 1). The components excluding water weigh in total 29.61 kg which is approximately 40% of the mass of water. The amounts of components may be scaled up or down while maintaining the same weight percentages of the components in order to prepare a smaller or a larger batch of 40% nanoscale TOP emulsion.

In yet another embodiment, nanoscale TOP emulsion is prepared as a 70% solution wherein components of the emulsion composition excluding water together make up approximately 70% of the mass of water. Typically, 70% nanoscale TOP emulsion comprises 42.96 kg of tall oil pitch, 74.1 kg of water, 0.34 kg of NaOH, 2.06 kg of tall oil rosin and 6.48 kg of isopropanol (Table 1). The components excluding water weigh in total 51.84 kg which is approximately 70% of the mass of water. The amounts of components may be scaled up or down while maintaining the same weight percentages of the components in order to prepare a smaller or a larger batch of 70% nanoscale TOP emulsion.

In yet another embodiment, nanoscale TOP emulsion is prepared as a 10% solution wherein components of the emulsion composition excluding water together make up approximately 10% of the mass of water. Typically, 10% nanoscale TOP emulsion comprises 6.14 kg of tall oil pitch, 74.1 kg of water, 0.05 kg of NaOH, 0.29 kg of tall oil rosin and 0.93 kg of isopropanol (Table 1). The components excluding water weigh in total 7.41 kg which is approximately 10% of the mass of water. The amounts of components may be scaled up or down while maintaining the same weight percentages of the components in order to prepare a smaller or a larger batch of 10% nanoscale TOP emulsion.

In another embodiment of the present invention, tall oil pitch is heated to a temperature of 40° C. or above prior to adding the tall oil pitch to the co-surfactant-tall oil rosin solution to reduce viscosity of the tall oil pitch.

Nanoscale TOP emulsion may be stored at normal room temperature of to 20-30° C. Owing to the properties of chemicals in this invention, it is possible to prepare solutions which are more concentrated than the above-described ready-to-use solutions, i.e. concentrates which may be stored also at temperatures below normal room temperature i.e. temperatures of 5° C. or above and less than 20° C., and which may be diluted just before the use. Ready-to-use nanoscale TOP emulsions are typically 10-40% solutions, preferably 20-35% solutions. Concentrates of up to 70% may be prepared. An advantage of preparing nanoscale TOP emulsion concentrates is easier transportation due to their smaller volume.

high pressure valve homogenizer, microfluidizer, or a sonicator, preferably an ultrasonicator.

In yet another embodiment the nanoscale emulsion is produced according to said method.

In another embodiment, the nanoscale emulsion comprises 5-35 wt-% of tall oil pitch of the total weight of the emulsion, preferably 5-25 wt-%, more preferably 10-25 wt-%.

In another embodiment, the nanoscale emulsion comprises 55-95 wt % of water of the total weight of the emulsion, preferably 75-95 wt-%, more preferably 75-85 wt-%.

In yet another embodiment, the nanoscale emulsion comprises NaOH. In another embodiment, the nanoscale emulsion comprises 0.05-0.3 wt-% of NaOH of the total weight of the emulsion, preferably 0.05-0.2 wt-%, more preferably 0.1-0.2 wt-%.

In yet another embodiment, the nanoscale emulsion comprises tall oil rosin. In another embodiment, the nanoscale emulsion comprises 0.3-1.7 wt-% tall oil rosin of the total weight of the emulsion, preferably 0.3-1.2 wt-%, more preferably 0.6-1.1 wt-%.

In yet another embodiment, the nanoscale emulsion comprises isopropanol. In another embodiment, the nanoscale emulsion comprises 1-5.5 wt-% isopropanol of the total weight of the emulsion, preferably 1-4 wt-%, more preferably 2-3.5 wt-%.

The composition according to the present invention may comprise various additives, depending on the use. Colouring agents such as organic colouring agents or pigments may be added to nanoscale TOP emulsion for surface treatment if a visual change similar to applying paint to the surface to be treated is desired. In this case an adhesive such as carboxymethyl cellulose (CMC) may be used in the nanoscale TOP emulsion. The pigments and organic colouring agents are preferably free of heavy metals and are REACH marked. For example, some iron oxide pigments may be used as a pigment. The physical properties of the developed product may be selected based on the intended use.

In another embodiment of the present invention, nanoscale TOP emulsion is supplemented with an iron oxide based colouring agent at a concentration of 0.1 wt-% to 10 wt-% of the total weight of the emulsion.

Supplementing nanoscale TOP emulsion with oxidizing chemicals such as hydrogen peroxide, peracetic acid, per-

TABLE 1

Components of 10%, 20%, 35%, 40% and 70% nanoscale TOP emulsions (NTOP). Weight percentages (wt-%) of components are calculated of the total weight of the emulsion.

| NTOP/ | 10% | | 20% | | 35% | | 40% | | 70% | |
| --- | --- | --- | --- | --- | --- | --- | --- | --- | --- | --- |
| Component | kg | wt-% | kg | wt-% | kg | wt-% | kg | wt-% | kg | wt-% |
| Tall oil pitch | 6.14 | 7.53 | 12.27 | 13.80 | 21.48 | 21.48 | 24.54 | 23.66 | 42.96 | 34.11 |
| Water | 74.10 | 90.91 | 74.10 | 83.34 | 74.10 | 74.09 | 74.10 | 71.45 | 74.10 | 58.84 |
| NaOH | 0.05 | 0.06 | 0.10 | 0.11 | 0.17 | 0.17 | 0.19 | 0.18 | 0.34 | 0.27 |
| Tall oil rosin | 0.29 | 0.36 | 0.59 | 0.66 | 1.03 | 1.03 | 1.18 | 1.14 | 2.06 | 1.64 |
| Isopropanol | 0.93 | 1.14 | 1.85 | 2.08 | 3.24 | 3.24 | 3.70 | 3.57 | 6.48 | 5.15 |

In an embodiment, the nanoscale emulsion comprises tall oil pitch. The nanoscale emulsion may further comprise tall oil rosin and isopropanol. In addition, the nanoscale emulsion may further comprise NaOH. The nanoscale emulsion comprising tall oil pitch, tall oil rosin and isopropanol is produced in a homogenizer, wherein the homogenizer is a formic acid, sodium percarbonate, sodium hypochlorite has surprisingly been found to diminish the brownish colour of tall oil pitch. This facilitates using a larger variety of colouring agents in the emulsion, increasing the amount of colours available to end users and improving the commercial value of nanoscale TOP products.

In an embodiment, the nanoscale emulsion comprises an oxidizing chemical selected from a group consisting of hydrogen peroxide, peracetic acid, performic acid, sodium percarbonate, sodium hypochlorite and mixtures thereof.

In another embodiment, the nanoscale emulsion comprises an oxidizing chemical at a concentration 10 wt-% to 30 wt-% of the total weight of the emulsion.

In yet another embodiment of the present invention, nanoscale TOP emulsion comprises hydrogen peroxide ($H_2O_2$) at a concentration of 10 wt-% to 30 wt-% of the total weight of the emulsion.

Supplementing nanoscale TOP emulsion with an insecticide has surprisingly been found to render the nanoemulsion applicable in treating wood and textile fibres to be resistant against damage caused by insects.

In an embodiment of the present invention, the nanoscale emulsion comprises an insecticide selected from a group consisting of formic acid salts of alkali metals, formic acid salts of alkali earth metals and mixtures thereof.

In another embodiment of the present invention, the nanoscale emulsion comprises an insecticide which is an aqueous solution or dispersion having an active ingredient concentration of 0.01 wt-% to 50 wt-% by weight of the total weight of the emulsion, preferably 1.0 wt-% to 15 wt-% to reach an end concentration of 0.01 wt-% to 0.03 wt-% of the active ingredient in the nanoscale emulsion.

Supplementing nanoscale TOP emulsion with surfactants has surprisingly been found to improve penetration of the preservative into the wood fibre material. Also, surprisingly, the use of surfactants increases the stability of the nanoscale TOP emulsion.

Surfactants are wetting agents that lower the surface tension of a liquid, allowing easier spreading, and lower the interfacial tension between two liquids. A surfactant may be classified by the presence of formally charged groups in its head groups. A non-ionic surfactant has no charge groups in its head groups. The head of an ionic surfactant carries a net charge. If the charge is negative, the surfactant is anionic and if the charge is positive, the surfactant is cationic. If a surfactant contains a head with two oppositely charged groups, it is termed zwitterionic.

Some commonly encountered surfactants include anionic surfactants based on sulfate, sulfonate or carboxylate groups such as perfluorooctanoate (PFOA or PFO), perfluoro-octane sulfonate (PFOS), sodium dodecyl sulphate (SDS), ammonium lauryl sulfate, sodium alkyl sulfate and other alkyl sulfate salts, sodium laureth sulfate, alkyl benzene sulfonate, soaps or fatty acid salts.

Cationic surfactants include e.g. cetyl pyridinium chloride (CPC), polyethoxylated tallow amine (POEA), benzalkonium chloride (BAC), benzethonium chloride (BZT) and surfactants based on quaternary ammonium groups such as cetyl trimethylammonium bromide (CTAB), hexadecyl trimethyl ammonium bromide and other alkyltrimethylammonium salts. Zwitterionic (amphoteric) detergents include e.g. dodecyl betaine, cocamidopropyl betaine and coco ampho glycinate.

Nonionic surfactants include e.g. alkyl poly(ethylene oxide), alkylphenol poly(ethylene oxide), copolymers of poly(ethylene oxide), poly(propylene oxide), poloxamers, poloxamines, alkyl polyglucosides including octyl glucoside and decyl maltoside, fatty alcohols including cetyl alcohol and oleyl alcohol, cocamide MEA, cocamide DEA, dodecyldimethylamine oxide and polysorbates including Tween 20 and Tween 80.

In an embodiment, the nanoscale emulsion comprises a surfactant selected from a group consisting of sulfate containing surfactants, sulfonate containing surfactants, carboxylate containing surfactants, sodium alkyl benzene sulphonate, sodium dodecyl sulfate, ammonium lauryl sulfate, alkyl sulfate salts, sodium laureth sulfate, alkyl benzene sulfonate salt, alkyl benzene fatty acid salt, cationic surfactants based on quaternary ammonium cations, cetylpyridinium chloride, non-ionic surfactants, alkyl polyglucosides, fatty alcohols, cetyl alcohol, oleyl alcohol and mixtures thereof.

Additives selected from the group comprising antimicrobial agents, agents against insects such as termites, anti-cracking agents such as adhesive agents, UV protective agents, viscosity modifiers, anti-oxidants, fire-retardants, free-radical capturers, bleaching agents such as organic peracid or colouring agents such as organic colouring agents or pigments may also be added to the nanoscale TOP emulsion.

Thus an embodiment enables producing a wood and textile fibre protection composition from tall oil pitch. An embodiment also relates to a wood and textile fibre protection composition comprising tall oil pitch and use of the composition as a wood and textile fibre protection agent. The invention is relevant to industries involved in treating wood and textile fibres to protect natural and recycled fibres from weathering and microbial growth. An embodiment enables producing safe and ecological wood protection chemicals from tall oil pitch.

EXAMPLES

Example 1. Production of Nanoscale TOP Emulsion

A 20% nanoscale tall oil pitch emulsion was prepared as follows. Water (74.1 kg) was added to a mixing vessel at an ambient temperature, NaOH (0.10 kg) was added to the water and the resulting solution was mixed until it was clear without any precipitates. Tall oil rosin (0.59 kg, FOR90S, Forchem Oy) was added to the NaOH solution. Isopropanol (1.85 kg) was added to the NaOH-tall oil rosin solution. The components were mixed thoroughly in the mixing vessel and poured to a 100 liter container. Ultrasonic vessel head was placed on top of the container. Tall oil pitch (12.27 kg, Forchem Oy) was added gradually to the solution. The solution was ultrasonicated for 15 minutes to break the particles of tall oil pitch and to form a nanoscale tall oil pitch emulsion.

Example 2. Cold Stability of Nanoscale TOP Emulsion

Cold stability of the 20% nanoscale TOP emulsion produced according to the method of Example 1 was tested by storing the emulsion at −18° C. for 24 hours and thawing at room temperature. No weakening in dispersion or layer formation properties was visually observed when nanoscale TOP emulsion had recovered to normal room temperature. Nanoscale TOP emulsion remained water soluble and homogeneous.

Example 3. Properties of Impregnated Heat Treated Wood Samples

Water repellency and tackiness of heat-treated wood samples treated with nanoscale TOP emulsion was studied by impregnating the heat-treated wood samples by immersion in the nanoscale TOP emulsion for two hours at a temperature designated in Table 2. A 20% nanoscale TOP emulsion produced according to the method of Example 1 was used in the experiment. The nanoscale TOP emulsion was optionally supplemented with a colouring agent containing iron oxides, Pasta A Red (Teknos Oy).

Water repellency of the immersion treated wood samples was determined by introducing a water droplet on the surface of the treated wood sample and determining contact angle of the droplet with the solid surface. Tackiness was determined by tactile evaluation of the surface of the treated wood samples.

When a liquid drop is placed upon a plane solid surface the different species of molecules interact with one another to establish a balance of forces. If the adhesional forces between liquid and solid are greater than the cohesional forces of the liquid, then the liquid spontaneously spreads on the solid surface. It is said to wet the solid surface. However, if the forces reach an intermediate balance, the liquid drop will establish a contact angle θ with the solid surface as shown in FIG. 1. The balance of forces around the periphery of the drop where it meets the solid surface establish a contact angle. The contact angle may be used as a measure of water repellency of the surface—the larger the angle, the greater the water repellency. The drop may also penetrate into the wood, establishing a contact angle of 0° and indicating that water repellency is not present.

The results of the experiment are presented in Table 2. Nanoscale TOP emulsion had penetrated inside the wood structure and provided water repellency, because contact angles larger than 0° were established and penetration of water was not observed visually. A high temperature (130° C.) during immersion treatment improved water repellency. No crack formation was observed in the wood panels despite of high temperatures of up to 130° C. used in immersion impregnation.

A tactile evaluation was performed to determine tackiness of the treated samples. The treated samples were non-tacky with a silky feel on the surface. In a visual evaluation, the colouring agent and the UV protection agent were found to have penetrated into the wood. The colouring of the sample surfaces was uniform. No solid residue from the colouring agent was visually observed on the surface of the treated samples, indicating the coloring agent was well miscible into the nanoscale TOP emulsion and penetrated into the wood with the emulsion.

TABLE 2

Water repellency and tackiness of heat-treated wood samples.

| Wood sample | Immersion treatment solution | Temperature | θ |
|---|---|---|---|
| Heat treated pine | NTOP | 60° C. | 50° |
|  | NTOP + 1 wt-% Pasta A Red | 60° C. | 70° |
| Heat treated spruce | NTOP | 130° C. | 90° |
|  | NTOP | 60° C. | 60° |
|  | NTOP + 1 wt-% Pasta A Red | 60° C. | 50° |
| Heat treated ash | NTOP | 60° C. | 50° |
|  | NTOP + 1 wt-% Pasta A Red | 60° C. | 50° |

NTOP = nanoscale TOP emulsion, θ = contact angle.

Example 4. Properties of an Impregnated Wood Sample

Water repellency and tackiness of a wood sample treated with nanoscale TOP emulsion was studied by impregnating the wood sample by immersion in the nanoscale TOP emulsion for two hours at a 100° C. temperature. A 20% nanoscale TOP emulsion produced according to the method of Example 1 was used in the experiment.

Water repellency of the immersion treated wood sample was determined by introducing a water droplet on an inside surface of the treated wood sample that had been exposed by cutting the treated wood sample in half. During the immersion treatment, the later exposed inside surface was within the interior of the wood sample at a depth of approximately 5 mm to 6 mm. Contact angle of the droplet with the solid surface was determined as indicated in Example 3. Tackiness was determined by tactile evaluation of the surface of the treated wood sample.

The contact angle result of the experiment is presented in Table 3. Nano-scale TOP emulsion totally penetrated inside the pine wood sample and good water repellency was observed.

The treated pine wood sample was non-tacky after the immersion treatment. As a reference, a glass plate with no porous fibre structure to facilitate penetration was treated similarly, by immersion in the nanoscale TOP emulsion for two hours at a 100° C. temperature. Nanoscale TOP emulsion formed a tacky coating over the glass material, showing that absence of tackiness is a sign of penetration and also that penetration into a material reduces or removes tackiness.

UV-aging of the treated wood sample with a 254 nm wavelength UV light for 4 hours indicated that water repellency was even more improved during UV-aging treatment based on visual evaluation of contact angle. No exude (tacky residues) was observed as a result of UV-aging. In addition, when warming up the treated wood sample at 70° C. for 4 hours wood water repellency further improved based on visual evaluation of contact angle, and no exude was observed.

TABLE 3

Water repellency of wood sample.

| Wood sample | Immersion treatment solution | Temperature | θ |
|---|---|---|---|
| Scottish pine | NTOP | 100° C | 90° |

NTOP = nanoscale TOP emulsion, θ = contact angle.

Example 5. Properties of Surface Treated Wood Samples

Water repellency and tackiness of wood samples treated with nanoscale to TOP emulsion was studied by surface treatment. A 35% nanoscale TOP emulsion produced according to the method of Example 1 using the amounts of components described in Table 1 was used in the experiment. The 35% nanoscale TOP emulsion was also diluted with water using one part by weight of 35% nanoscale TOP emulsion and 1 part by weight of water to produce a 1:1 dilution. Alternatively, one part by weight of 35% nanoscale TOP emulsion and 2 parts by weight of water were used to produce a 1:2 dilution. Surface treatment was performed by brushing the wood samples three times with 35% nanoscale TOP emulsion or 1:1 or 1:2 dilution of the 35% nanoscale TOP emulsion. The treated wood materials were 1) pine, 2) spruce, 3) heat treated pine, 4) plywood made of spruce and 5) Japanese cedar.

Drying of the treated wood samples was examined visually and tackiness of the surfaces was evaluated by checking if paper towels attached to the treated surfaces. After the wood samples were deemed dry, water repellency of the treated wooden samples was analysed by the water drop test as indicated in Example 3.

The results indicated that all of the three solutions tested, the 35% nanoscale TOP emulsion as well as 1:1 and 1:2 dilutions of the 35% nanoscale TOP emulsion improve water repellency of the treated wood samples as compared to non-treated control samples where in all cases the contact angle was 0°, indicating presence of no water repellency.

TABLE 4

Water repellency of samples surface treated with 35% nanoscale TOP emulsion or 1:1 or 1:2 dilution of the 35% nanoscale TOP emulsion.

| Wood sample | Surface treatment solution | θ |
|---|---|---|
| Pine | Non-treated control | 0° |
| | NTOP | 70° |
| | NTOP 1:1 dilution | 50° |
| | NTOP 1:2 dilution | 45° |
| Spruce | Non-treated control | 0° |
| | NTOP | 80° |
| | NTOP 1:1 dilution | 60° |
| | NTOP 1:2 dilution | 50° |
| Heat-treated pine | Non-treated control | 0° |
| | NTOP | 80° |
| | NTOP 1:1 dilution | 60° |
| | NTOP 1:2 dilution | 50° |
| Plywood made of spruce | Non-treated control | 0° |
| | NTOP | 60° |
| | NTOP 1:1 dilution | 40° |
| | NTOP 1:2 dilution | 35° |
| Japanese cedar | Non-treated control | 0° |
| | NTOP | 65° |
| | NTOP 1:1 dilution | 50° |
| | NTOP 1:2 dilution | 40° |

NTOP = nanoscale TOP emulsion, θ = contact angle.

Example 6. UV and Weathering Properties of Heat-Treated Pine Samples Surface Treated with Nanoscale TOP Emulsion Heat-treated pine samples were surface treated by brushing with 20% nanoscale TOP emulsion that was optionally supplemented with 1 wt-% of a coloring agent containing iron oxides, Pasta A Red (Teknos Oy). Heat-treated pine wood to samples were also surface treated with commercially available wood treatment solutions wood oil A, wood oil B or wood wax B. Surface treatment was performed in such a manner that retention (g/m$^2$) of each treatment solution in the wood samples was approximately 100 g/m$^2$. A control sample was left untreated.

Weather resistance of the treated samples was assessed according to standard EN 927-6:2006 (Paint and varnishes. Coating materials and coating systems for exterior wood. Part 6: Exposure of wood coatings to artificial weathering using fluorescent UV lamps and water).

The weather resistance experiment was performed in a QUV accelerated weathering tester. The QUV simulates sunlight with fluorescent ultraviolet lamps, and rain and dew with water spray. The weathering schedule followed the standard EN 927-6:2006. An exposure cycle of one week consists of a condensation period followed by a sub-cycle of water spray and UV-A 340 irradiation as given in to Table 5. The weather resistance experiment involves a continuous light irradiation of 2.5 hours following water spray of 0.5 hour. The average irradiance was 0.85 W/m$^2$ at 340 nm wavelength. The samples were placed in the QUV without aluminium panels. Colour changes on the sample surfaces were estimated every 186 hours. The total test time was 1344 hours i.e. 8 weeks. Water uptake of treated wood samples was determined at the end of the weather resistance experiment, and the results are presented in Table 6.

Test Equipment:

QUV Accelerated Weathering Tester 73-thru 75-spray

Temperature and moisture meter: Vaisala HMI41 and HMP42

Erichsen Picogloss 500 mc

Magnifiers: Carton 30×, Hama 8×

Hygrometer: Gann Hydromette compact A

Scales: Precise 2200 C

TABLE 5

| Exposure cycles according to standard EN 927-6: 2006 | | | | |
|---|---|---|---|---|
| Step | Function | Temperature | Duration | Condition |
| 1 | Condensation | (45 ± 3)° C. | 24 h | |
| 2 | Subcycle step 3 + 4 | | 144 h consisting of 48 cycles of 3 h consisting of steps 3 and 4 | |
| 3 | UV | (60 ± 3)° C. | 2.5 h | irradiance set point 0.89 W/(m$^2$ nm) at 340 nm |
| 4 | Spray | | 0.5 h | 6 to 7 l/min, UV off |

Figure 2:
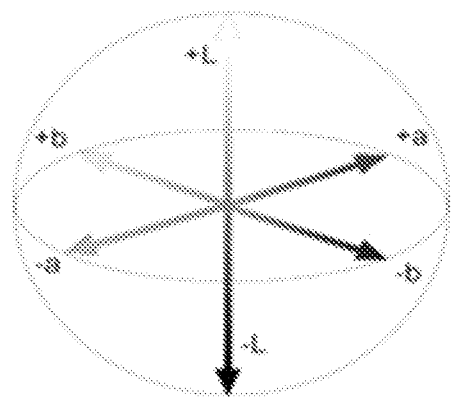
FIG. 2 shows the three parameters, L*, a* and b*, characterized by the CIELAB system of the Commission International de l'Eclairage (CIE). L* axis represents the lightness and a* and b* are chromaticity coordinates. In the CIELAB system, +a* is for red, −a* for green, +b* for yellow, −b* for blue and L* varies from 100 (white) to 0 (black)

Colour change of the treated wood samples was determined using Spectrophotometer CM-2500d (Konica Minolta). The CIELAB system (according to Commission International de l'Eclairage, CIE) characterizes three parameters, L*, a* and b*. L* axis represents the lightness and a* and b* are chromaticity coordinates (FIG. 2). In the CIELAB system, +a* is for red, −a* for green, +b* for yellow, −b* for blue and L* varies from 100 (white) to 0 (black). The colour change ΔE* was measured after every 186 hours using D65 light source as established by CIE 1976. The colour change ΔE* is calculated from equation (1) based on the ΔL*, Δa* and Δb* values that are calculated from equations (2) to (4) and represent the changes to between the initial (i) and final (f) values. The results are presented in Table 7. A low ΔE* corresponds to low colour change.

$$\Delta E^* = \sqrt{\Delta L^{*2} + \Delta a^{*2} + \Delta b^{*2}} \quad (1)$$

$$\Delta L^* = L_f^* - L_i^* \quad (2)$$

$$\Delta a^* = a_f^* - a_i^* \quad (3)$$

$$\Delta b^* = b_f^* - b_i^* \quad (4)$$

Surface treatment with nanoscale TOP emulsion reduced water uptake of the heat-treated pine wood samples compared to the non-treated control as shown in Table 6. The water uptake protecting effect was even more pronounced when the nanoscale TOP emulsion was supplemented with a colouring agent. The performance of nanoscale TOP emulsion exceeded that of the commercial wood oils and wood wax.

TABLE 6

Water uptake of surface treated heat treated pine samples after 8 weeks exposure in a weather resistance experiment according to standard EN 927-6: 2006.

| Surface treatment solution | Retention (g/m$^2$) | Water uptake (%) |
|---|---|---|
| Non-treated control | — | 58 |
| NTOP | 100 | 14 |
| NTOP + 1 wt-% Pasta A Red | 105 | 5 |
| Commercial wood oil A | 100 | 38 |
| Commercial wood oil B | 110 | 40 |
| Commercial wood wax B | 107 | 30 |

NTOP = nanoscale TOP emulsion.

TABLE 7

Colour change ΔE* of surface-treated heat treated pine samples in a weather resistance experiment according to standard EN 927-6: 2006. The results are reported after 1, 2, 4 and 8 weeks exposure.

| | ΔE* | | | | |
|---|---|---|---|---|---|
| Surface treatment solution | 1 week | 2 weeks | 4 weeks | 8 weeks | Total |
| Control (heat-treated) | 11 | 7 | 12 | 13 | 43 |
| NTOP | 12 | 8 | 14 | 8 | 42 |
| NTOP + 1 wt-% Pasta A Red | 10 | 8 | 4 | 14 | 36 |
| Commercial wood oil A | 10 | 14 | 23 | 14 | 61 |
| Commercial wood oil B | 8 | 9 | 14 | 14 | 45 |
| Commercial wood wax B | 4 | 5 | 7 | 7 | 23 |

Total indicates the sum of colour change during the entire 8 week period.
NTOP = nanoscale TOP emulsion.

Thermally modified wood's surface degrades easily and changes colour by UV weathering. Nanoscale NTOP emulsion offers similar protection to wood than commercial wood oils and wax. Pigmented (coloured) nanoscale TOP emulsion performed best among the tested wood oils and waxes as its water uptake was the lowest and it reduced the colour change well. Also the non-pigmented nanoscale TOP emulsion resisted water uptake better than the commercial wood oils and wax.

Example 7. Resistance of Nanoscale TOP Emulsion Against Mould and Blue Stain

The test was carried out using samples of sapwood of pine because it is most prone to growth of mould and blue stain. Wood samples were surface treated by brushing with 20% nanoscale TOP emulsion. Surface treatment was performed in such a manner that retention (g/m$^2$) of the treatment solution in the wood samples was approximately 150 g/m$^2$.

Pine wood samples surface treated with nanoscale TOP emulsion as described above were subjected to mould and blue stain growth tests. In the mould growth test, surface treated pine wood samples and non-treated controls were inoculated with *Aspergillus versicolor, Cladosporium sphaerospermum* and *Penicillium* sp. and incubated for 4 weeks at a temperature of 25±2° C. in petri dishes in a relative humidity (RH) of 90±5%. In the blue stain growth test, surface treated pine wood samples and non-treated controls were incubated for 4 weeks at a temperature of 22±2° C. in glass jars in a relative humidity (RH) of 70±5%. The glass jars had been filled halfway with wood pellets comprising blue stain (*Sclerophoma pithyophila* (EN 152-2) and *Aureobasidium pullulans*) growth, and the wood sample was placed on top of the pellets for exposure to blue stain contamination.

Figure 3:
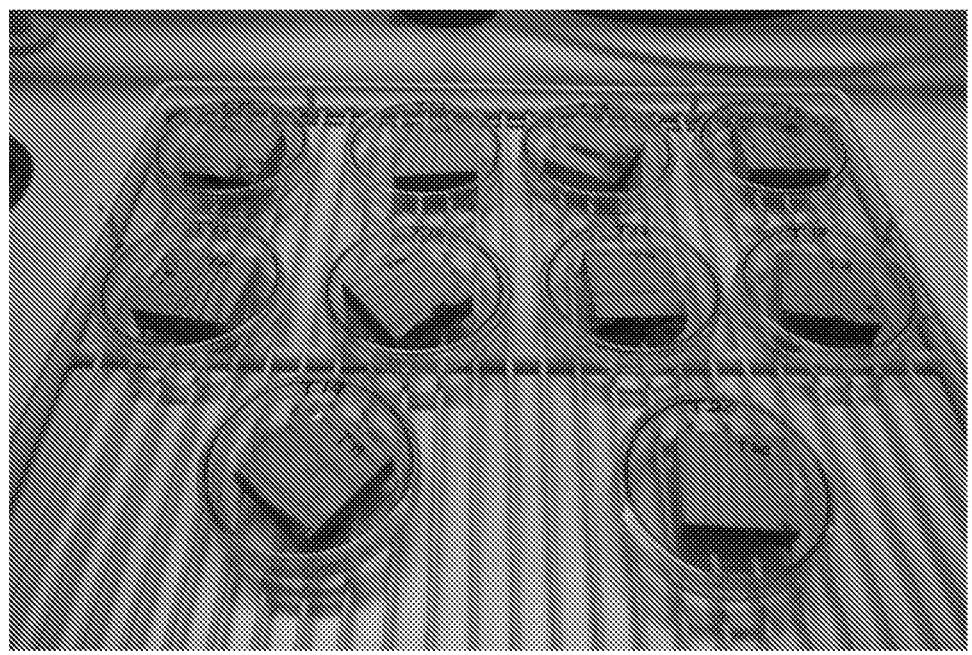
FIG. 3 shows growth of mould on heat-treated pine wood samples surface treated with nanoscale TOP emulsion after 4 weeks exposure.
Figure 4:
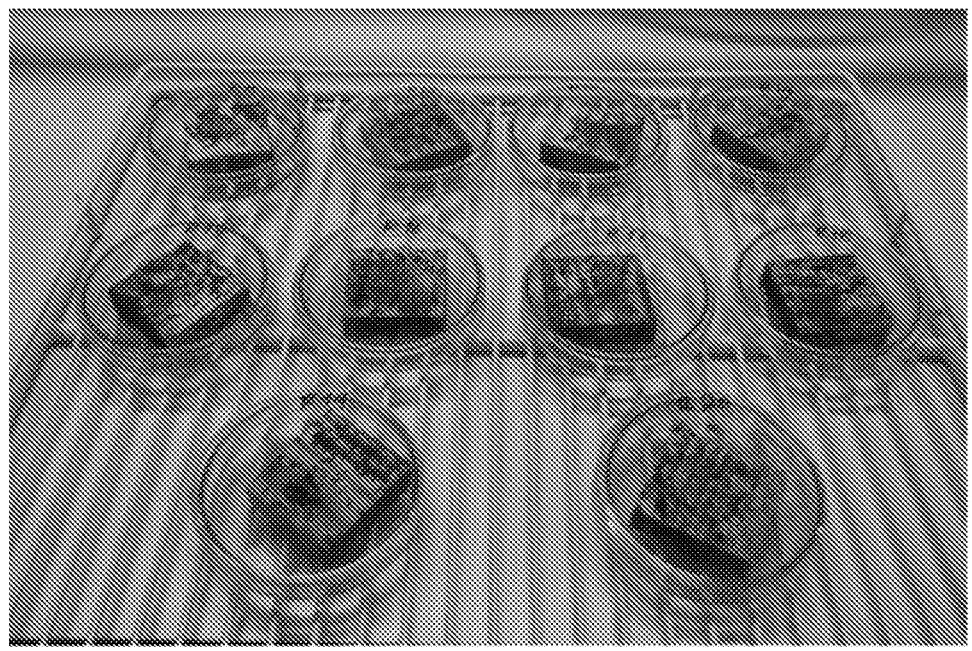
FIG. 4 shows growth of mould on heat-treated pine wood control samples after 4 weeks exposure.
Figure 5:
FIG. 5 shows growth of blue stain on heat-treated pine samples surface treated with nanoscale TOP emulsion after 4 weeks exposure.
Figure 6:
FIG. 6 shows growth of blue stain on heat-treated pine wood control samples after 4 weeks exposure.

Mould and blue stain growth on pine wood was significantly reduced or prevented by surface treatment with nanoscale TOP emulsion. FIGS. 3 and 4 show results of mould contaminated surface treated and control samples, respectively, after 4 weeks exposure. FIGS. 5 and 6 show results of blue stain contaminated surface treated and control samples, respectively, after 4 weeks exposure. In a visual evaluation, control samples invariably show signs of microbial growth, whereas microbial growth is significantly reduced or non-existent in the surface treated samples.

Example 8. Strength Properties of Impregnated Wood Samples

Strength of wood samples treated with nanoscale TOP emulsion was studied by impregnating the wood samples by immersion in the nanoscale TOP emulsion for two hours at 60° C. A 35% nanoscale TOP emulsion produced according to the method of Example 1 and using the amounts of components reported in Table 1 was used in the experiment. The treated wood materials were 1) heat-treated Finnish pine, 2) heat-treated Finnish spruce and 3) Japanese cedar.

Nanoscale TOP emulsion impregnation increased the strength of the heat treated pine, Japan cedar wood and spruce samples. When samples were cut in half no cracking or loss of strength was visually observed as compared to non-impregnated control samples.

Example 9. Penetration Depth of Wood Impregnation

Penetration depth of nanoscale TOP emulsion was studied in treatment of wood by immersion impregnation or pressure impregnation. Finnish pine wood was treated with 20% nanoscale TOP emulsion supplemented with 0.1 wt-% methylene blue coloring agent to enhance visualization of penetration depth in the treated wood samples. Immersion impregnation was performed by immersing the wood sample into the treatment solution for two hours at 130° C. Pressure impregnation was performed with the treatment solution at a pressure of 10 bar.

In immersion impregnation, penetration depth of the nanoscale TOP emulsion was in the range of 5 mm to 6 mm, whereas in pressure impregnation penetration was complete, reaching the core of the wood sample with dimensions of length 500 mm, width 100 mm and height 25 mm. The surfaces of the treated wood samples were non-tacky as determined by tactile evaluation, and water repellency was excellent according a visual evaluation of contact angle in the water drop test.

Example 10. Effect of an Oxidizing Agent

In order to diminish the brownish hue of nanoscale TOP emulsion, hydrogen peroxide ($H_2O_2$, 30 wt-%) was added to 20% nanoscale TOP emulsion at an end concentration of 16 wt-%. Pine wood samples were impregnated by immersion (60° C., 2 h) into the nanoscale TOP emulsion-$H_2O_2$ solution.

After the immersion treatment a visual evaluation revealed the surface of the pine wood samples retained its original color i.e. the surface had no brownish hue. The surface was non-tacky as determined by tactile evaluation.

It will be obvious to a person skilled in the art that, as the technology advances, the inventive concept can be implemented in various ways. The invention and its embodiments are not limited to the examples described above but may vary within the scope of the claims.

The invention claimed is:

1. A method of producing a nanoscale tall oil pitch emulsion, wherein the method comprises the following steps:
   a) providing an aqueous solution of an alkaline agent, wherein the aqueous solution has a pH in the range of 8 to 13,
   b) providing tall oil rosin,
   c) mixing the tall oil rosin with the aqueous solution of the alkaline agent to produce a tall oil rosin solution,
   d) providing an organic solvent having a hydrocarbon chain of 1 to 6 carbons,
   e) mixing the organic solvent having a hydrocarbon chain of 1 to 6 carbons with the tall oil rosin solution to produce an organic solution-tall oil rosin solution,
   f) providing tall oil pitch,
   g) adding the tall oil pitch to the organic solution-tall oil rosin solution under homogenization in a homogenizer to produce the nanoscale tall oil pitch emulsion comprising tall oil pitch in an amount of 5-25 wt-%
   wherein the homogenizer is a sonicator.

2. The method according to claim 1, wherein the alkaline agent is a hydroxide of an alkali metal or alkaline earth metal.

3. The method according to claim 1, wherein prior to said adding the method comprises heating the tall oil pitch to a temperature of 40° C. or above.

4. The method according to claim 1, wherein the organic solvent having a hydrocarbon chain of 1 to 6 carbons is an alcohol.

5. The method according to claim 1, wherein the nanoscale tall oil pitch emulsion comprises the tall oil rosin in an amount of 0.3-1.7 wt-%.

6. The method according to claim 1, wherein the nanoscale tall oil pitch emulsion comprises the organic solvent in an amount of 1-5.5 wt-%.

7. A preservative for a wood or textile fiber, comprising:
   a nanoscale tall oil pitch emulsion produced according to the method of claim 1.

8. The method according to claim 1, wherein the alkaline agent comprises NaOH in an amount of 0.05-0.3 wt-%.

* * * * *